Patented Feb. 1, 1927.

1,615,870

UNITED STATES PATENT OFFICE.

ARTHUR W. DOX, OF DETROIT, MICHIGAN, ASSIGNOR TO PARKE, DAVIS & COMPANY, OF DETROIT, MICHIGAN, A CORPORATION OF MICHIGAN.

SECONDARY BUTYL ALLYL BARBITURIC ACID.

No Drawing.   Application filed August 7, 1923. Serial No. 656,301.

My invention relates to synthetic manufacture of a new compound of the barbituric acid series which exhibits greater sedative properties than other hypnotics of this series hertofore used in the practice of medicine. This compound may be designated by the name secondary butyl allylbarbituric acid and represented by the following structural formula:—

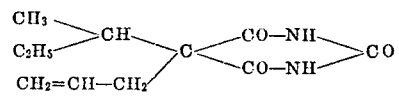

In the commercial preparation of this compound, I have found it advantageous to carry out the process in two steps, the first resulting in the formation of an intermediate compound, secondary butyl barbituric acid, and the second comprising the treatment of the intermediate compound in alkoline solution with an allyl halide which results in the formation of secondary butyl allyl barbituric acid.

In carrying out the first step of the process, the following procedure is used: 23 parts by weight of sodium are dissolved in 300 parts of absolute alcohol under a reflux condenser and after cooling, 216 parts of ethyl secondary butyl malonate and 90 parts of urea are added. The mixture is boiled gently under a reflux condenser for eight hours or autoclaved at about 105° for six hours. The greater part of the alcohol is then removed by evaporation, the product is dissolved in water, and a slight excess of hydrochloric acid added. This causes the separation of white scaly crystals of secondary butyl barbituric acid, which after recrystallization from a suitable solvent, for example alcohol, melt at 199° C.

In the second step of the process, 184 parts by weight of the secondary butyl barbituric acid crystals obtained in the first step are dissolved in 400 parts of ten per cent (10%) sodium hydroxide solution and 121 parts of allyl bromide or the equivalent amount of allyl chloride or iodide added. The mixture is heated under pressure at about 100° C. for eight hours with continuous shaking, after which the product is evaporated until the odor of allyl bromide has disappeared. Hydrochloric acid is then added causing the separation of white crystals of secondary butyl allyl barbituric acid which may be purified by dissolving in benzene and precipitating with petroleum ether.

Secondary butyl allyl barbituric acid melts at 110° C. It is soluble in alcohol, ether, benzene and caustic alkalies, and slightly soluble in water, but it is insoluble in petroleum ether. It has strong hypnotic properties and is of particular value as a medicinal agent since the sedative properties are greater than are exhibited by the other componds of the barbituric acid series.

While the details of procedure, as outlined above, have been found to be satisfactory for the commercial preparation of this compound, my invention is not limited to the exact details except as expressed in the appended claim.

What I claim as my invention is:

As a new product, a compound which may be designated as the secondary butyl allyl derivative of barbituric acid which is a white crystalline solid melting at 110° C. and possessing hypnotic properties, said compound having the following formula

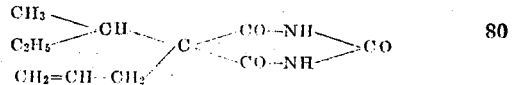

In testimony whereof I affix my signature.

ARTHUR W. DOX.